United States Patent [19]
Chang et al.

[11] Patent Number: 5,328,707
[45] Date of Patent: Jul. 12, 1994

[54] RECOVERY OF WASTE LIQUID FROM PRODUCTION OF RICE LIQUOR

[75] Inventors: Rey-Chein Chang; Jyh-Feng Hwang, both of Hsinchu, Taiwan

[73] Assignee: Industrial Technology Research Institute, Hsinchu, Taiwan

[21] Appl. No.: 907,292

[22] Filed: Jul. 1, 1992

[51] Int. Cl.⁵ .................... A23K 1/06; B01D 1/18
[52] U.S. Cl. ................................. 426/271; 159/47.3; 203/37; 203/71; 426/618; 426/624; 426/471
[58] Field of Search ............... 159/47.3, 48.1; 203/90, 203/36, 37, DIG. 6; 210/799, 770, 737, 766; 426/271, 624, 618, 471

[56] References Cited

U.S. PATENT DOCUMENTS

| | | | |
|---|---|---|---|
| 1,172,270 | 2/1916 | Franzie | 426/18 |
| 2,263,608 | 11/1941 | Brown | 426/624 |
| 3,615,663 | 10/1971 | Becker | 159/48.1 |
| 4,069,033 | 1/1978 | Baldassari | 159/47.3 |
| 4,069,103 | 1/1978 | Müller | 426/53 |
| 4,109,019 | 8/1978 | Moore | 426/471 |
| 4,200,500 | 4/1980 | Desai | 203/7 |
| 4,278,699 | 7/1981 | Yoshizawa et al. | 426/624 |
| 4,642,238 | 2/1987 | Lin et al. | 426/471 |
| 4,664,920 | 5/1987 | Saleeb et al. | 426/471 |
| 4,775,477 | 10/1988 | Stahl et al. | 210/652 |
| 4,777,051 | 10/1988 | Nagano et al. | 426/471 |
| 4,828,846 | 5/1989 | Rasco et al. | 426/618 |
| 4,889,734 | 12/1989 | Shatila | 426/462 |

FOREIGN PATENT DOCUMENTS

| | | | |
|---|---|---|---|
| 0486961 | 5/1992 | European Pat. Off. | 426/624 |
| 0195911 | 3/1923 | United Kingdom | 426/624 |
| 0869059 | 5/1961 | United Kingdom | 426/624 |
| 8300006 | 1/1983 | World Int. Prop. O. | 426/624 |
| 8300007 | 1/1983 | World Int. Prop. O. | 426/624 |

Primary Examiner—Virginia Manoharan
Attorney, Agent, or Firm—Fish & Richardson

[57] ABSTRACT

A process for recovering waste liquid from the distillation of fermented rice liquor. After filtration of the waste liquid, the residue can be recovered as dry feed, and the filtrate which contains about 4–5% crude protein, 1% starch and 92 wt. % water is first concentrated to lower the water content to about 70–80 wt. %. The filtrate is then dried with a spray dryer to produce nutritious dry feed while a suitable chelating agent such as magnesium hydroxide is used to prevent the clinging of the product on the wall of the dryer.

2 Claims, 5 Drawing Sheets

RECOVERY OF WASTE LIQUID FROM PRODUCTION OF RICE LIQUOR

BACKGROUND OF THE INVENTION

The present invention relates to a process for recovering the waste liquid that is produced from the distillation of rice liquor, and more particularly to the recovery of a nutritious product.

In the production of rice liquor, rough rice (or brown rice) is usually used as the raw material. As shown in FIG. 1, the production of rice liquor involves the processes of soaking, cooking, cooling, saccharification and fermentation of the raw materials. The fermented product is then distilled to yield raw rice liquor. After aging for a period of time, rice liquor is blended with a suitable amount of alcohol and then filtered to obtain the finished product. However, waste liquid or dregs are produced during the distillation of the fermented liquor. As a result, a process is required to treat these wastes to comply with effluent standards.

Conventionally, the waste liquid from the distillation of the fermented liquor is treated with a biological treating process. As shown in FIG. 2, the biological treatment mainly consists of three steps, i.e., a pretreatment, a secondary treatment and an after treatment, wherein waste slurry is produced from a regulating pond and a primary sedimentation pond in the pretreatment, a biological treating device in the secondary treatment, and a final sedimentation pond in the after treatment. The waste liquid treated by the conventional biological process conforms to effluent standards, and the slurry is subsequently treated with a slurry treatment that includes the steps of dehydration, drying and incineration. As mentioned-above, the conventional process for treating the waste liquid from distillation in the production of rice liquor is complicated and costly.

SUMMARY OF THE INVENTION

Therefore, it is an object of the present invention to provide a simple process for recovering waste liquid that is produced from the distillation of fermented liquor in the production of rice liquor.

It is another object of the present invention to provide a process for recovering nutritious dry products from the distillation waste liquid to raise the economic value of the waste.

In the present invention, an evaporating concentrator and a spray dryer are utilized to recover the waste liquid, and a suitable chelating agent is also introduced to prevent the clinging of the dry powder to the wall of the spray dryer.

Generally, the distillation waste liquid from rice liquor has a composition and properties as follows:

1. Composition:
total soluble solid phase : 3.0–3.5 wt. %
total suspension solid phase: 4.5–5.5 wt. %
water : 92 wt. %
alcohol : <0.9 wt. %
2. Temperature of the waste liquid: 85°–95° C.
3. pH value of the waste liquid : 3.6–4.2

In addition, the distillation waste liquid is rich in protein since the raw material used in the production of rice liquor is unrefined rice. The residue (containing the lees of rice liquor etc.) from the filtration of the waste liquid is recovered as dry feed, and the filtrate which contains about 4–5% crude protein, 1% starch and 92 wt. % water is recovered using the process of the present invention. The filtrate is first concentrated using an evaporating concentrator to decrease the water content to a range of about 70–80 wt. %. Then, the concentrated waste liquid is dried in a spray dryer to produce dry powder that can also be recovered as feed. In addition, a chelating agent the hydroxide of an alkaline earth metals is used to prevent the clinging of the powder on the wall of the dryer.

As shown in FIG. 3, the waste liquid from the distillation of fermented liquor is introduced to an evaporating concentrator to remove some of the water in the waste liquid. After the addition of a chelating agent, the concentrated waste liquid is treated with a spray dryer, wherein a stream of hot air is supplied from a heat source, and dry product is collected from the dryer.

BRIEF DESCRIPTION OF THE DRAWINGS

Other features and advantages of the invention will be apparent from the following preferred embodiment in connection with the accompanying drawings wherein.

DETAILED DESCRIPTION OF A PREFERRED EMBODIMENT

Figure 1:
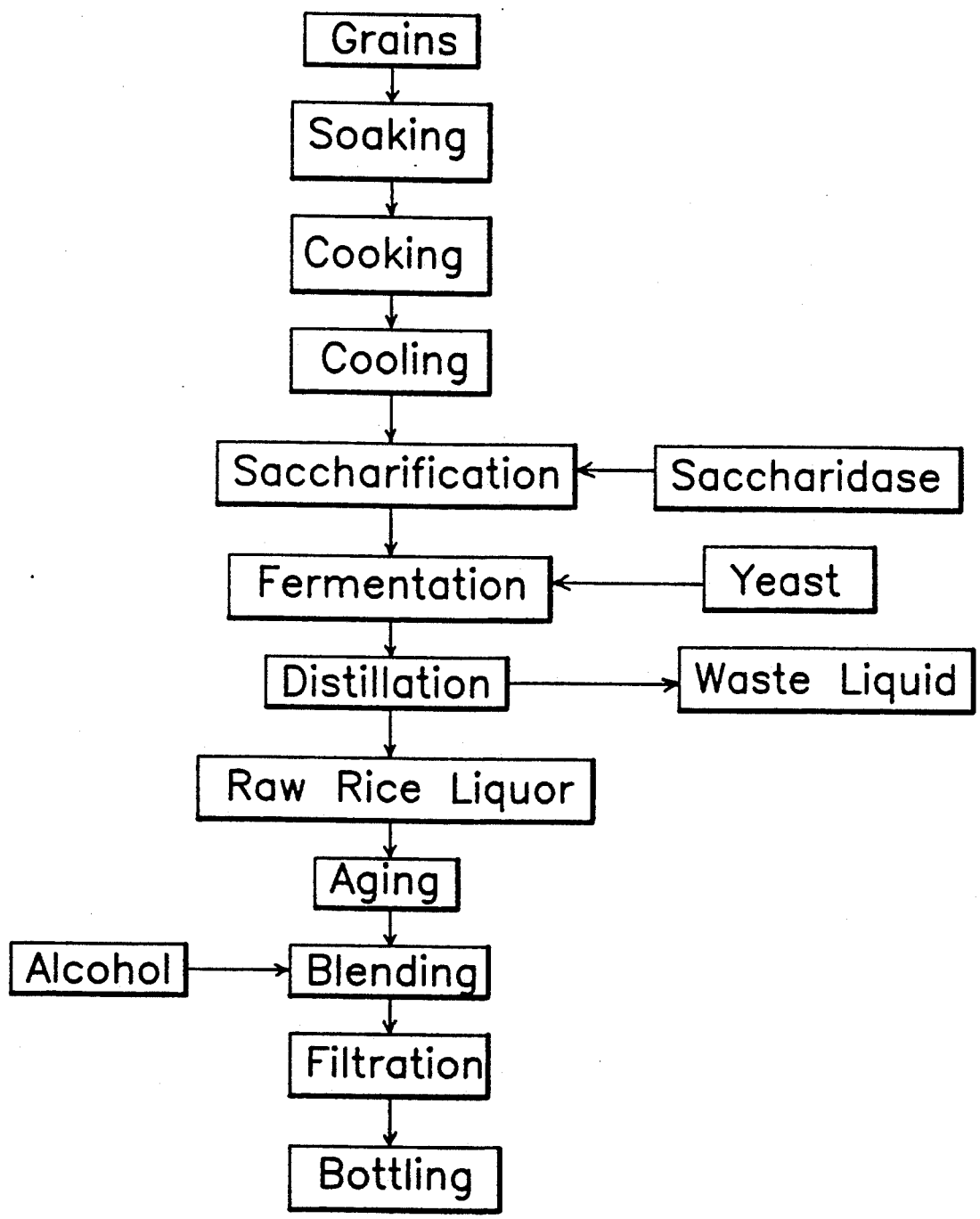
FIG. 1 is a flow chart of the production of rice liquor.
Figure 2:
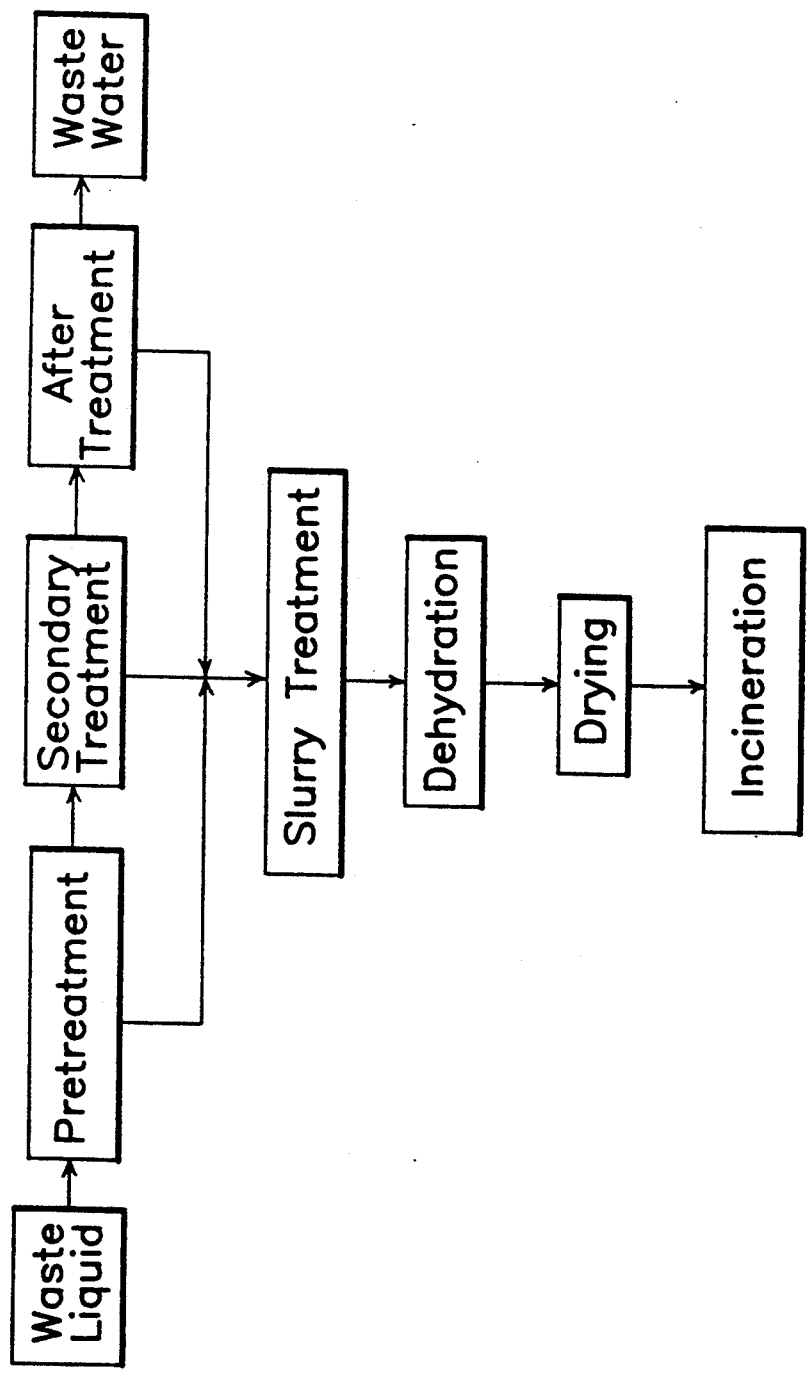
FIG. 2 is a conventional biological process for treating the waste liquid from distillation.
Figure 3:
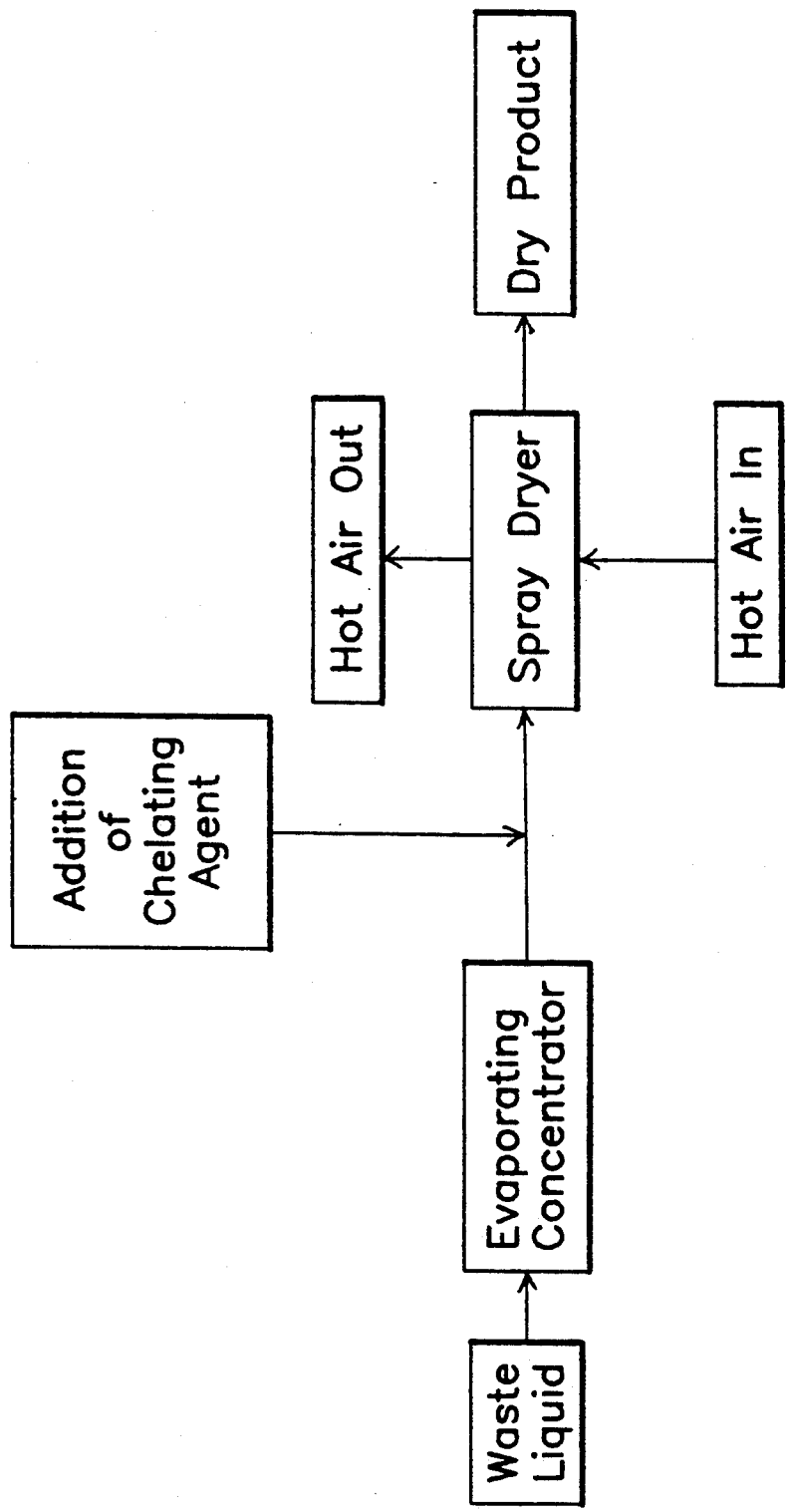
FIG. 3 is a flow chart of the recovery process of the present invention.
Figure 4:
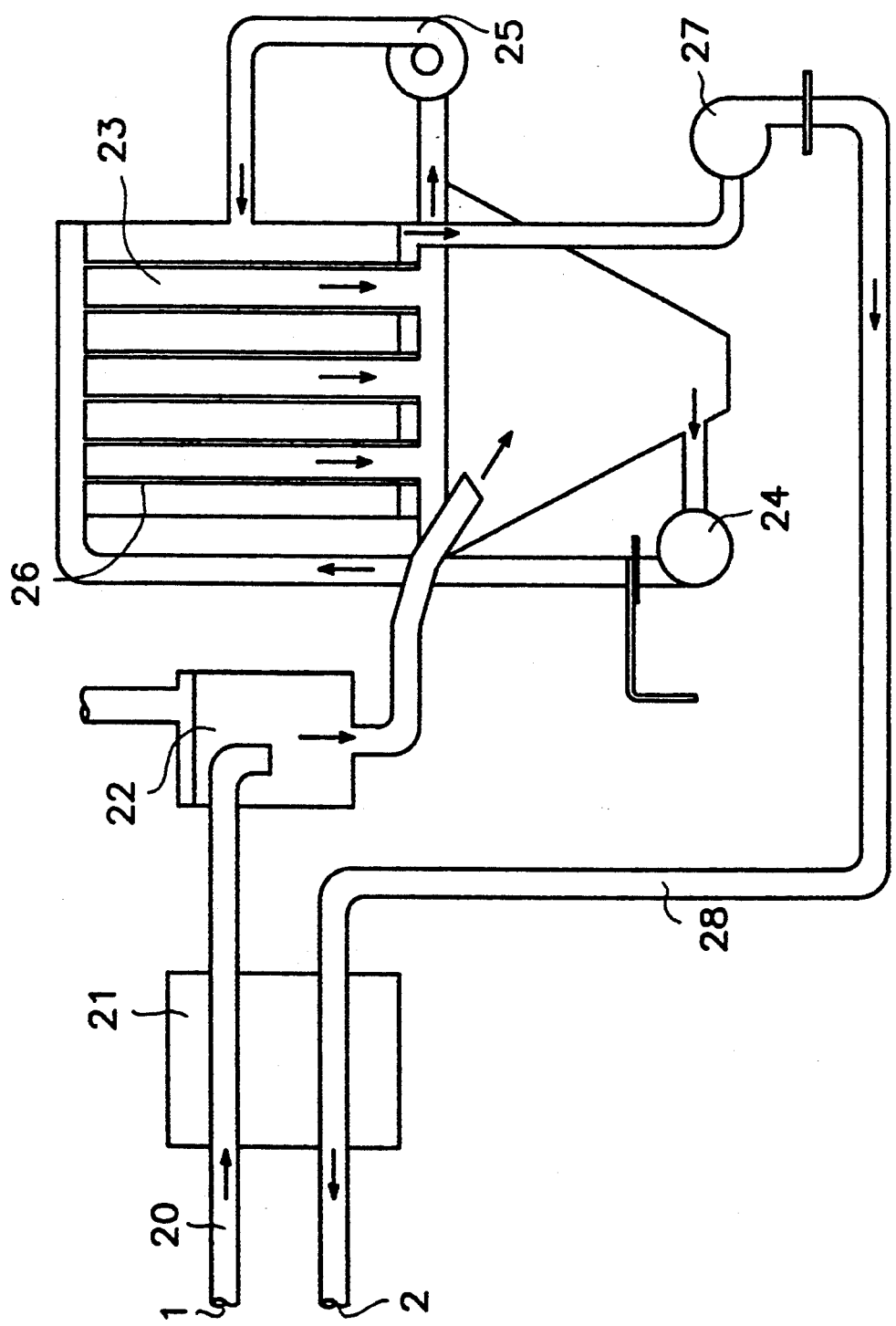
FIG. 4 is a schematic diagram of the evaporating concentrator of the present invention.

As shown in FIG. 4, the waste liquid (1) after filtration is introduced to a heat exchanger (21) and a defoaming device (22) through a pipe (20), then to an evaporating concentrator (23). In the evaporating concentrator (23), the waste liquid is conveyed to the top of the concentrator using a pump (24), and then flows downward for a heat exchange with the compressed steam from a steam compressor (25) through a heat exchange pipe (26), wherein the condensed water can be conveyed to the steam compressor (25) for recycling. After the removal of moisture from the waste liquid, there is about 70–80 wt. % of water left, and the length of time the waste liquid remains in the concentrator must be controlled for the waste liquid to attain a certain moisture level range. Subsequently, the concentrated waste liquid (2) is conveyed through a pipe (28) by using a pump (27) to the heat exchanger (21), and then to a spray drying system.

Figure 5:
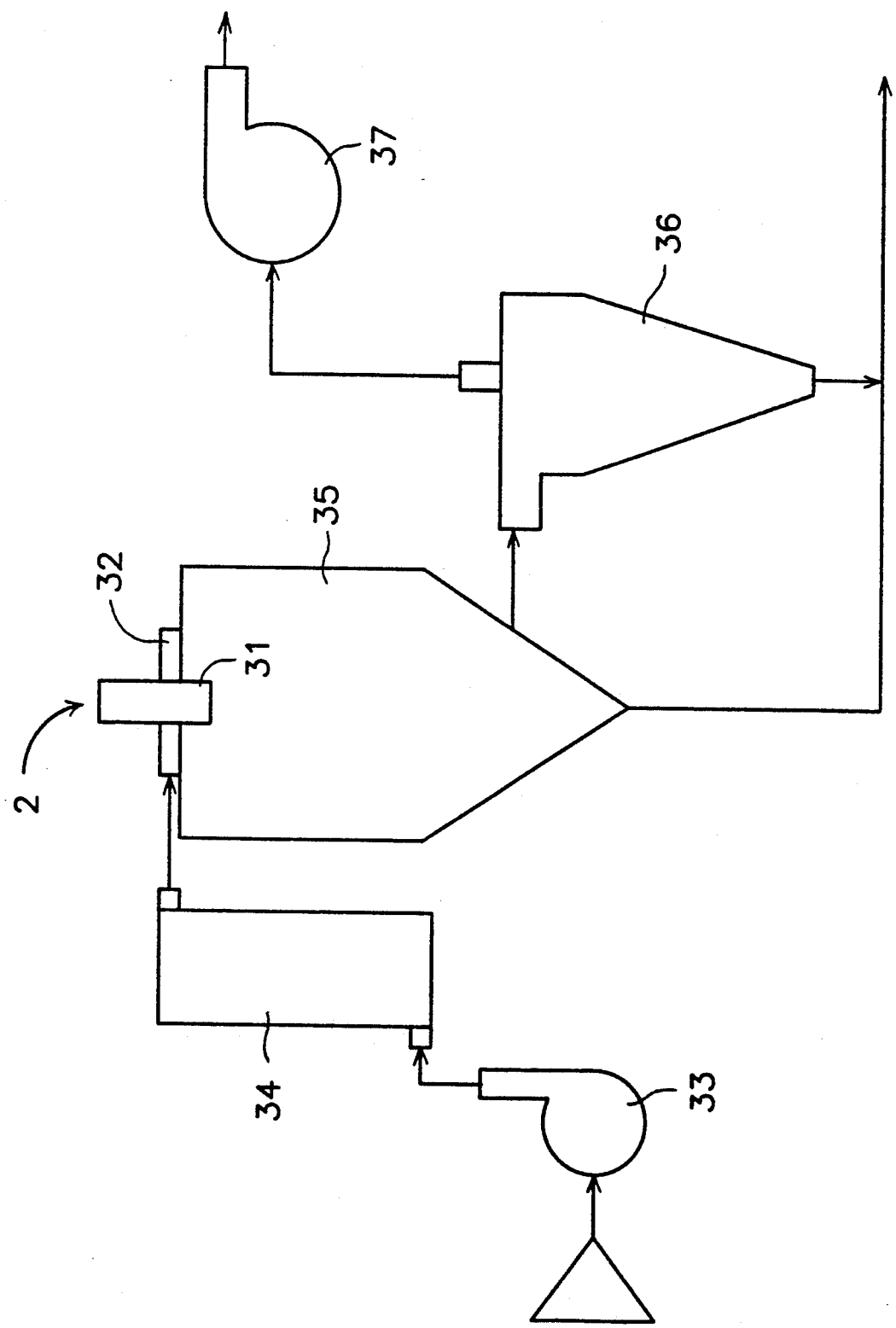
FIG. 5 is a schematic diagram of the spray dryer of the present invention.

A schematic diagram of the spray drying system of the present invention is shown in FIG. 5. The concentrated waste liquid (2) is conveyed to an atomizer,(31) set in the roof of a drying chamber (35), which is used for atomizing the waste liquid into a stream of hot air, supplied from an air fan (33) through a heater (34) and an air disperser (32), in the form of a mist of fine droplets. Moisture is rapidly vaporized from the droplets, leaving residual particles of dry powder, which are then separated from the gas stream using a cyclone (36). During the solid-gas separation in the cyclone (36), waste gas is discharged through an exhaust fan (37), and the dry powder is collected from both the drying chamber (35) and the cyclone (36).

The distillation waste liquid from the fermented liquor is rich in protein which consists of many amino acids, wherein each amino acid is different in its isoelectric point. Also, most of the proteins are soluble proteins, and the pH value of the concentrated waste liquid (2) is adjusted to a nearly neutral point. After adjustment of the pH value, the proteins contain many amino acids with a negative charge, i.e., the proteins are rich in lysine or other amino acids that are over the isoelectric point. As a result, the concentrated waste liquid is unsuitable for sedimentation, and the solid product from the concentrated waste liquid easily clings to the wall of the spray dryer. Therefore, it is inconvenient to collect the powdery product, and the powdery product is easily charred or burnt. Consequently, a suitable chelating agent should be used for preventing the clinging of solid powder. Accordingly, a chelating agent the hydroxide of an alkaline earth metals such as magnesium hydroxide, is used in the spray dryer of the present invention. As a result of the addition of the chelating agent to the waste liquid, the clinging phenomenon of the solid powder is greatly improved, e.g., the clinging to the wall is lowered from over 95% to less than 10% by adding 1.5-2.5 wt. % (based on solid of waste liquid) of chelating agent.

The solid powder recovered from the distillation waste liquid using the present process is rich in protein and other nutritious components, therefore it can be used as feed for livestock or other animals. In addition, the recovery process of the present invention is not as complicated as the conventional biological process. As such, the present invention can reuse the recovered product to increase the economic value of the waste liquid.

While the invention has been described by way of preferred embodiment, it is to be understood that the invention need not to be limited to the disclosed embodiment. On the contrary, it is intended to cover various modifications and similar arrangements included within the spirit and scope of the appended claims.

What is claimed is:

1. A process for recovering as a dry product waste liquid that is produced from distillation of fermented liquor in the production of rice liquor and contains 3.0-3.5 wt. % total soluble solid, 4.5-5.5 wt. % total suspension solid, 92 wt. % water, and <0.9 wt. % alcohol, said process comprising:

filtering said waste liquid;

concentrating said filtered waste liquid in an evaporating concentrator to produce a concentrated waste liquid with a water content of 70-80 wt. %;

adding a suitable amount of a chelating agent to said concentrated waste liquid for preventing clinging of solid powder on the wall of a spray dryer, said chelating agent consisting of magnesium hydroxide; and drying said concentrated waste liquid in said spray dryer to produce a dry product.

2. A process as claimed in claim 1, wherein said chelating agent is added in the amount of 1.5-2.5 wt. % based on solid of the waste liquid.

* * * * *